United States Patent
Yu et al.

(10) Patent No.: US 8,280,149 B2
(45) Date of Patent: Oct. 2, 2012

(54) METHOD AND APPARATUS TO FACILITATE PROCESSING A STEREOSCOPIC IMAGE USING FIRST AND SECOND IMAGES TO FACILITATE COMPUTING A DEPTH/DISPARITY IMAGE

(75) Inventors: Tianli Yu, Schaumburg, IL (US); Boaz J. Super, Westchester, IL (US); Bei Tang, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1004 days.

(21) Appl. No.: 11/853,338

(22) Filed: Sep. 11, 2007

(65) Prior Publication Data

US 2009/0067705 A1 Mar. 12, 2009

(51) Int. Cl.
G06K 9/00 (2006.01)
G06T 15/00 (2006.01)
G06T 15/40 (2006.01)

(52) U.S. Cl. .................. 382/154; 345/419; 345/421
(58) Field of Classification Search .............. 382/154; 345/419–427
See application file for complete search history.

(56) References Cited

U.S. PATENT DOCUMENTS

| | | |
|---|---|---|
| 2005/0286756 A1 | 12/2005 | Hong et al. |
| 2005/0286758 A1 | 12/2005 | Zitnick, III et al. |
| 2006/0204040 A1* | 9/2006 | Freeman et al. .............. 382/107 |
| 2007/0086646 A1* | 4/2007 | Yang et al. .................... 382/154 |

FOREIGN PATENT DOCUMENTS

EP 0 871 144 A2 10/1998

OTHER PUBLICATIONS

Kuhn et al., "Efficient ASIC Implementation of a Real-Time Depth Mapping Stereo Vision System", 2003 IEEE International Symposium on Micro-NanoMechatronics and Human Science, Dec. 27-30, 2003, pp. 1478-1481 vol. 3.*

Yang et al., "Stereo Matching with Color-Weighted Correlation, Hierarchical Belief Propagation and Occlusion Handling", CVPR, Jun. 2006.*

(Continued)

Primary Examiner — Anand Bhatnagar
Assistant Examiner — Soo Park
(74) Attorney, Agent, or Firm — James A. Lamb; Randi L. Karpinia; Kenneth A. Haas

(57) ABSTRACT

The processing of a stereoscopic image using first and second images to facilitate computing a corresponding depth/disparity image can be facilitated by providing (101) the first and second images and then computing (103) a disparity value of each pixel in the second image by, at least in part, determining a likelihood of occlusion for at least some pixels comprising the second image using, at least in part, predicted occlusion information as corresponds to information contained in the first image. By one approach, this predicted occlusion information can be provided, at least in part, by processing (102) the first image, at least in part, by determining occlusion value information for at least some pixels as comprise the first image and then using the occlusion value information for the first image to determine a corresponding disparity information map for the first image.

12 Claims, 2 Drawing Sheets

OTHER PUBLICATIONS

Yang et al—"Stereo Matching With Color-Weighted Correlation, Hierarchical Belief Propagation and Occlusion Handling"—IEEE Computer Society Conference on Computer Vision and Pattern Recognition (CVPR'06)—2006—8 pages.

Jian Sun, Yin Li, Sing Bing Kang, Heung-Yeung Shum, Symmetric Stereo Matching for Occlusion Handling, CVPR 2005.

Yi Deng, Qiong Yang, Xueyin Lin, Xiaoou Tang, A Symmetric Patch-Based Correspondence Model for Occlusion Handling, ICCV 2005.

Vladimir Kolmogorov, Ramin Zabih, Computing Visual Correspondence with Occlusions Using Graph Cuts, 2001.

V. Kolmogorov, A. Criminis, A. Blake, G. Cross, C. Rother, Bi-Layer Segmentation of Binocular Stereo Video, CVPR 2005.

Oliver Williams, Michael Isard, John MacCornick, Estimating Disparity and Occlusions in Stereo Video Sequences, CVPR 2005.

Cheng Lei, Jason Selzer, Yee-Hong Yang, Region-Tree Based Stereo Using Dynamic Programming Optimization, CVPR 2006.

\* cited by examiner

METHOD AND APPARATUS TO FACILITATE PROCESSING A STEREOSCOPIC IMAGE USING FIRST AND SECOND IMAGES TO FACILITATE COMPUTING A DEPTH/DISPARITY IMAGE

TECHNICAL FIELD

This invention relates generally to the processing of stereoscopic images.

BACKGROUND

Stereoscopic images are known in the art. Such images typically relate to using a first and a second image wherein both such images represent a view, from slightly different locations, of a same scene. Many times (and perhaps in keeping with normal human vision) the first image will comprise a so-called left image and the second image will comprise a so-called right image.

In stereoscopic images, part of the scene as is visible in one of the images will not be visible in the remaining image due to occlusion. With information about such an occluded area being available from only one image, it becomes difficult to compute the depth of the occluded region using traditional triangulation calculations. Such occluded areas can also make it more difficult to calculate depth for regions that neighbor the occluded areas.

Interest in stereoscopic images continues to grow. This includes, for example, proposals to employ stereoscopic images in active display platforms such as, but not limited to, personally transportable devices (such as cellular telephones, personal digital assistants, and so forth). The above-noted problems with occluded areas, however, tend to reduce user satisfaction and/or to significantly increase the cost of the corresponding platform in order to better accommodate such operational circumstances. Existing approaches in this regard, for example, tend to converge to a solution in a relatively slow manner and/or via use of a relatively large store of available memory.

BRIEF DESCRIPTION OF THE DRAWINGS

The above needs are at least partially met through provision of the method and apparatus to facilitate processing a stereoscopic image using first and second images to facilitate computing a depth/disparity image described in the following detailed description, particularly when studied in conjunction with the drawings, wherein.

Figure 1:
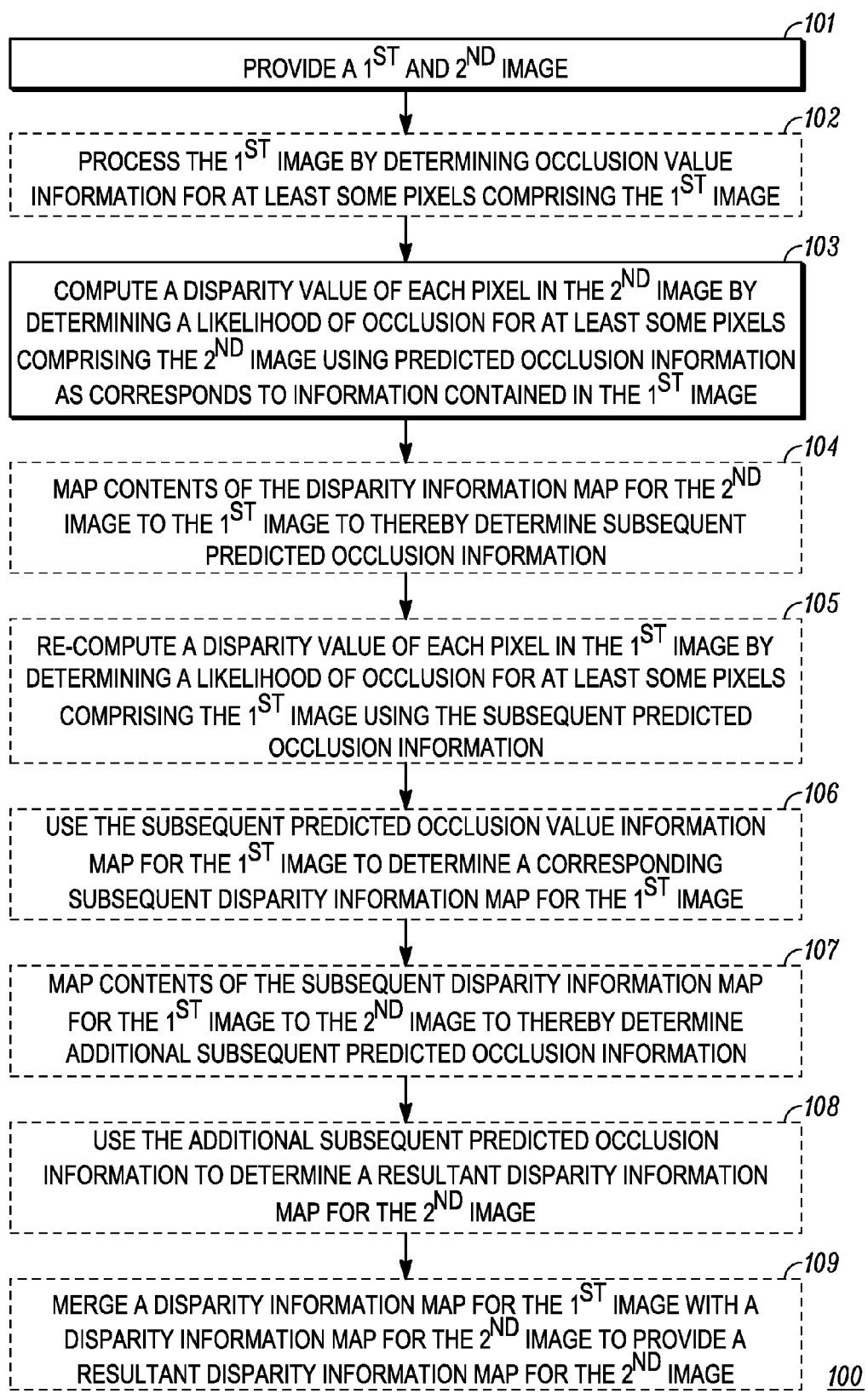
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, the processing of a stereoscopic image using first and second images to facilitate computing a corresponding depth/disparity image can be facilitated by providing the first and second images and then computing a disparity value of each pixel in the second image by, at least in part, determining a likelihood of occlusion for at least some pixels comprising the second image using, at least in part, predicted occlusion information as corresponds to information contained in the first image. By one approach, this predicted occlusion information can be provided, at least in part, by processing the first image, at least in part, by determining occlusion value information for at least some pixels as comprise the first image and then using the occlusion value information for the first image to determine a corresponding disparity information map for the first image.

By one approach, these teachings will also accommodate mapping contents of the disparity information map for the first image to the second image to thereby determine the aforementioned predicted occlusion information. This occlusion value information for the second image can then be used to determine a corresponding disparity information map for the second image. By one approach, the resultant disparity information can then be merged with the disparity information map for the first image mapped to the second image, to provide a resultant disparity information map for the second image.

These teachings will also accommodate, if desired, reworking the aforementioned first image disparity map in an iterative manner. This can comprise, for example, mapping contents of the disparity information map for the second image to the first image to thereby determine subsequent predicted occlusion information and re-computing a disparity value of each pixel in the first image by, at least in part, determining a likelihood of occlusion for at least some pixels comprising the first image using, at least in part, the subsequent predicted occlusion information. The subsequent predicted occlusion information can then be used to determine a corresponding subsequent disparity information map for the first image. These teachings will then accommodate mapping the contents of the subsequent disparity information map for the first image to the second image to thereby determine additional subsequent predicted occlusion information that can be used to determine a resultant disparity information map for the second image.

Those skilled in the art will recognize and appreciate that these teachings essentially provide for computing disparity and occluded regions together and then iterating the computation between the first and second images. More particularly, by using a knowledge of which pixels are occluded in the second image, a Markov Random Field-based stereo algorithm can then serve to estimate more reliable disparity values for the pixels that are not occluded; the teachings set forth herein permit those occluded pixels to be predicted using previous calculations. Such an approach tends to require less time and less memory than prior art approaches in this regard.

These and other benefits may become clearer upon making a thorough review and study of the following detailed description. Referring now to the drawings, and in particular to FIG. 1, an illustrative process 100 to facilitate processing a stereoscopic image using a first and a second image to facilitate computing a depth/disparity image that is compatible with many of these teachings will now be presented.

Following provision 101 of the aforementioned first and second images (which can generally otherwise accord with prior art practice in this regard, if desired, and may comprise, for example, the right and left images as often correspond to stereoscopic images), this process 100 can optionally provide for processing 102 the first image, at least in part, by determining occlusion value information for at least some pixels as comprise that first image. This occlusion value information for the first image can then be used to determine a corresponding disparity information map for the first image. The contents of such a disparity information map for the first image can then be mapped to the second image to thereby determine corresponding predicted occlusion information.

Regardless of how obtained, this process 100 then provides for using such predicted occlusion information as corresponds to information contained in the first image to compute 103 a disparity value of each pixel in the second image by, at least in part, determining a likelihood of occlusion for at least some pixels (and, if desired, all the pixels) as comprise the second image. This, of course, represents a significant point of departure as compares to numerous prior art approaches. The purpose, use, and significance of this step may become more evident in light of the remaining description and provided details.

By one approach, this process 100 can then provide for merging 109 the disparity information map for the first image with the disparity information map for the second image to provide a resultant disparity information map for the second image.

These teachings will also accommodate, however, the reworking of the first image disparity map prior to such a step. This can comprise, for example, mapping 104 the contents of the disparity information map for the second image to the first image to thereby determine subsequent predicted occlusion information and then re-computing 105 a disparity value of each pixel in the first image by, at least in part, determining a likelihood of occlusion for at least some pixels comprising the first image using, at least in part, the aforementioned subsequent predicted occlusion information in an iterative fashion.

To illustrate, this subsequent predicted occlusion value information for the first image can now be used 106 to determine a corresponding subsequent disparity information map for the first image, following which the contents of this subsequent disparity information map for the first image can be mapped 107 to the second image to thereby determine additional subsequent predicted occlusion information. This additional subsequent occlusion information can then be used 108 to determine a resultant disparity information map for the second image.

Such reworking activities can, if desired, be repeated as many times as may be desired. Eventually, however, and again as noted above, the resultant disparity information map for the first image can be merged 109 with the disparity information map for the second image to provide a resultant disparity information map for the second image.

Figure 2:
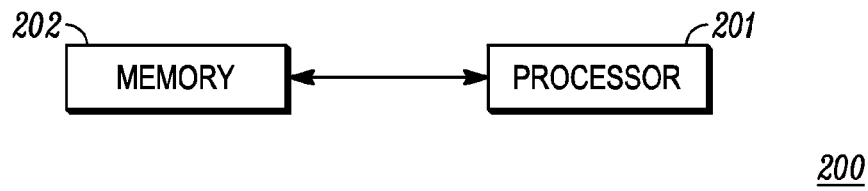
FIG. 2 comprises a block diagram as configured in accordance with various embodiments of the invention.

Further details regarding such steps are presented below. First, however, those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

As illustrated in FIG. 2, an apparatus 200 suitable to facilitate and embody these teachings through facilitation of the processing of a stereoscopic image using a first and second image to facilitate, in turn, computing a depth/disparity image can be generally comprised of a processor 201 that operably couples to a memory 202. The memory 202 serves to store the first and second image as well as any intervening data sets as are contemplated by these teachings. Those skilled in the art will recognize that this memory 202 can be comprised of a single integral component or can be realized through a distributed architecture.

The processor 201 can comprise a fixed-purpose hardware platform or can comprise a partially or wholly programmable platform. Such architectural choices are well known in the art and require no further elaboration here. Such a processor 201 can be configured and arranged (via, for example, corresponding programming as will be well understood by those skilled in the art) to carry out one of more of the steps and functionality describe herein. This can comprise at the least, for example, providing the aforementioned first and second images and computing a disparity value of each pixel in the second image by, at least in part, determining a likelihood of occlusion for at least some pixels as comprise the second image using, at least in part, predicted occlusion information as corresponds to information contained in the first image.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

Those skilled in the art will recognize and appreciate that these teachings make use of a multi-phase occlusion handling approach for stereo imagery computations that is structurally simple and hence well suited to hardware-based implementations if desired. It will also be recognized that such an approach is generally more computationally efficient than numerous existing approaches in this regard. Notwithstanding such benefits regarding simplicity and efficiency, the results obtained via these teachings compare favorably with existing best-in-class stereo computations. Furthermore, these benefits are well suited to support the use of such teachings in a video context, including a real time video context such as the real time rendering of streaming video content.

Figure 3:
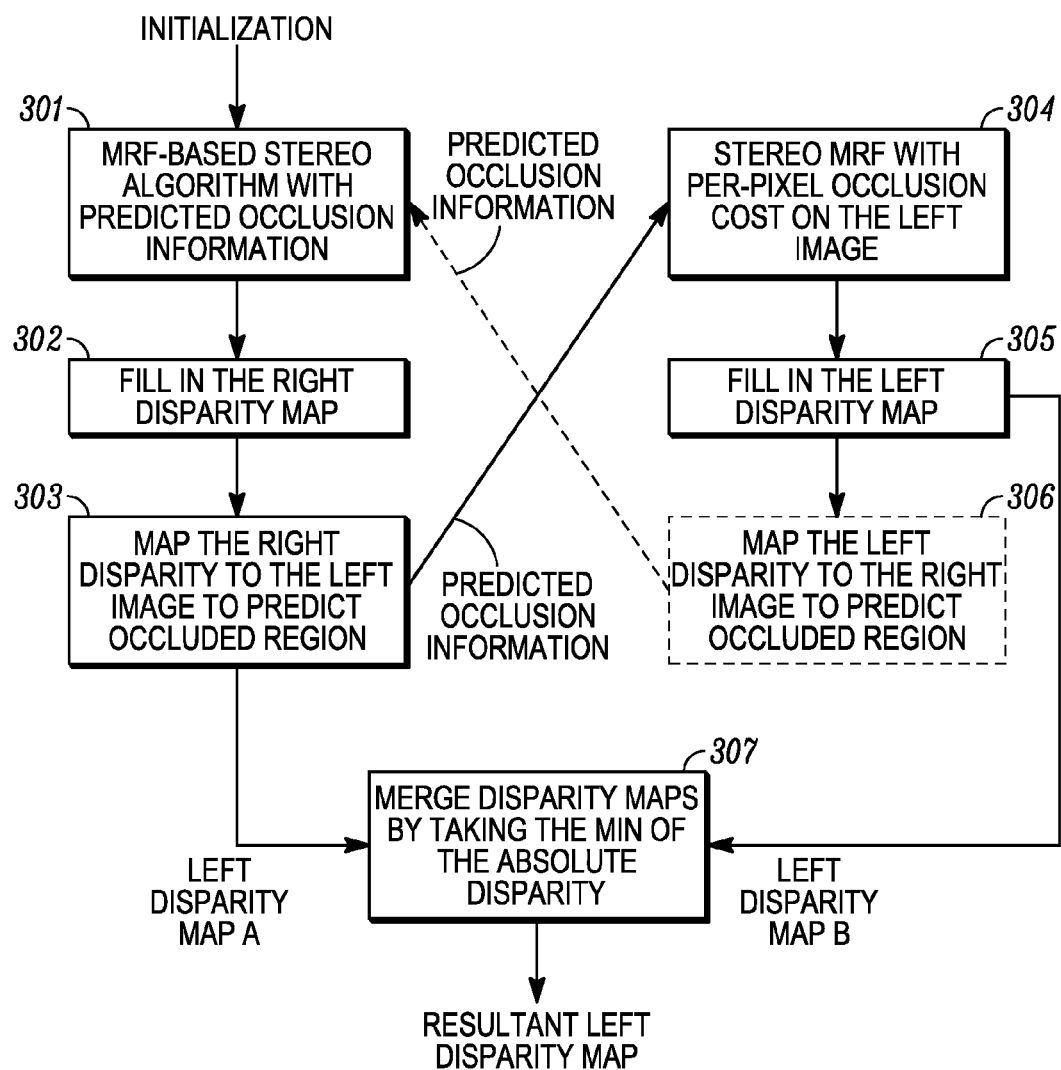
FIG. 3 comprises a flow diagram as configured in accordance with various embodiments of the invention.

Referring now to FIG. 3, a somewhat more specific and detailed explanation of a particular instantiation of these teachings will be provided. Those skilled in the art will recognize and understand that this example is intended to serve only in an illustrative capacity and is not intended to comprise an exhaustive offering of all possibilities in this regard.

Following initialization, this process provides for per-pixel occlusion cost determinations to be made with respect to a Markov Random Field (MRF) stereo algorithm (using predicted occlusion information) 301 for the right image of a stereoscopic reference. One then fills in 302 the disparity map for this right image and then maps 303 the right disparity to the left image of the stereoscopic reference to thereby predict the occluded region(s). Stereo MRF processing with per-pixel occlusion cost determination 304 then occurs for the left image as a function, at least in part, of the aforementioned predicted occluded region(s). The resultant information is then used to fill in 305 a disparity map for the left image.

To predict the occluded regions in the right (or left) image, one can start by mapping each pixel to the right (or left) image according to their disparity on the left (or right) image. The predicted occluded regions are those pixels in the right (or left) image that do not have any pixels in the left (or right image) mapped to them.

At this point, a left disparity map A (as is determined as a function of mapping 303 the right disparity to the left image to thereby predict the occluded region(s)) can be merged 307 with a left disparity map B (as is determined upon filling in 305 the left disparity map) by taking, for example, the MIN of the absolute disparity to yield a resultant left disparity map. If desired, following filling in 305 the left disparity map, one can optionally map 306 the left disparity to the right image to thereby predict, again, the occluded region(s) and then re-enact the described process using this presumably better starting point. This process can be so iterated any number of times as desired.

As noted, by one approach, these teachings can be employed with Markov Random Field (MRF) formulations as are already well known in the art. Presuming this context for the sake of example and not by way of limitation, an optimal disparity map is the one that minimizes the following MRF energy term:

$$E = \sum E_{Image}(d(x)) + \sum_{x_1, x_2 \in N} E_{smooth}(d(x_1), d(x_2))$$

where $E_{image}$ is the image matching cost, $E_{smooth}$ is the smoothness cost, and d(x) is the disparity of pixel x and N in a neighborhood system (usually 4-connected where both "neighborhood systems" and "4-connectedness" are well understood concepts in the image processing and computer vision arts). $E_{smooth}$ enforces the constraints that neighboring pixels should have similar disparities. For the continued sake of this example, and again not by way of limitation, examples of these two costs might include:

$$E_{image}(d(x)) = \alpha \min(|I_L(x) - I_R(x+d(x))|, \gamma_1)$$

$$E_{smooth}(d(x_1), d(x_2)) = \beta \min(|d(x_1) - d(x_2)|, \gamma_2) * h(x_1, x_2)$$

where alpha, beta, gamma_1, and gamma_2 are constants and h(x1, x2) represents a weighting (computed, for example, from the image). Alpha and beta are weighting that adjust the relative strength of the $E_{smooth}$ term and the $E_{image}$. They can be adjusted empirically to balance the noise level and smoothness in the result disparity map. Gamma_1 and gamma_2 are two thresholds to limit the impact of an individual pixel to the overall energy. Gamma_1 can be determined by the average absolute color differences between neighboring pixels. Gamma_2 can be determined by the maximum disparity. H(x1, x2) can be any function that monotonically decreases based on the color differences of pixel x1 and x2.

To handle occlusion, one can add an occlusion state that is equivalent to another disparity level having, however, these energy functions:

$$E_{image}(d(x) = occ) = \lambda_1(x)$$

$$E_{smooth}(d(x_1) = occ, d(x_2)) = E_{smooth}(d(x_1), d(x_2) = occ)$$
$$= \lambda_2 * h(x_1, x_2)$$

$$E_{smooth}(d(x_1) = occ, d(x_2) = occ) = 0$$

where $\lambda_1(x)$ is the per-pixel image cost for the occlusion state, $\lambda_2$ is a constant, and occ means that the pixel is classified as occluded. Initially, $\lambda_1(x)$ may also comprise a constant, but once the occlusion prediction becomes available as described above, this value can be calculated instead as:

$$\lambda_1(x) = \lambda_0 * [1 - occ(x)] + \lambda_{occ} * occ(x)$$

Those skilled in the art will understand and recognize that the disparity of occluded pixels cannot be likely computed from stereo matching. Instead, pursuant to these teachings, such information can be filled in by using the disparity of their neighboring non-occluded pixels on a same scanline as represented by the following expression:

$$d(occ) = \text{sign}[d(x1)] * \min(abs[d(x1)], abs[d(x2)])$$

This fill in process can be efficiently implemented, if desired, by using a two-pass scan of the entire image (for example, first from the left side to the right side and then from the right side to the left side). For at least some application settings it may be important to first perform the occlusion fill in step in the current disparity image before mapping it to the other image to effect the occlusion prediction step. Such a precaution, for example, may reduce the false alarm rate of the occlusion prediction activity.

So configured, those skilled in the art will recognize and appreciate that these teachings can be implemented to achieve a per-pixel occlusion cost map that fits in a Markov Random Field formulation and that can be further optimized, if desired, with a disparity computation at the same time (using, for example, a belief propagation approach of choice). The use of an iterative approach that uses predicted occlusion information from a most recently computed disparity map to generate an occlusion cost map provides a mechanism for achieving high quality results while nevertheless greatly reducing immediate real time memory requirements.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, those skilled in the art will recognize that the above described modified energy function(s) can be further optimized, in a given application setting, by other methods applicable to MRF settings such as belief propagation.

We claim:

1. A method to facilitate processing a stereoscopic image comprising a first and second image to facilitate computing a depth/disparity image, comprising:
    computing, by a processor, a disparity map for the first image of the stereoscopic image using predicted occlusion information for the first image;
    computing, by the processor, a first disparity map for the second image of the stereoscopic image by mapping contents of the disparity map for the first image of the stereoscopic image to the second image of the stereoscopic image to determine predicted occlusion information for the second image of the stereoscopic image;
    determining, by the processor, a second disparity map for the second image of the stereoscopic image using the predicted occlusion information for the second image of the stereoscopic image;
    merging, by the processor, the first and second disparity maps for the second image of the stereoscopic image to generate a resultant disparity map for just the second image of the stereoscopic image.

2. The method of claim 1 further comprising:
mapping contents of the second disparity map for the second image of the stereoscopic image to the first image of the stereoscopic image to, thereby, determine subsequent predicted occlusion information for the first image of the stereoscopic image.

3. The method of claim 2 further comprising:
re-computing the disparity map for the first image of the stereoscopic image using the subsequent predicted occlusion information for the first image of the stereoscopic image; and
using the recomputed disparity map for the first image of the stereoscopic image, re-iterating the steps of:
mapping the contents of the disparity map for the first image of the stereoscopic image to the second image of the stereoscopic image to determine the predicted occlusion information for the second image of the stereoscopic image and to determine the first disparity map for the second image;
determining the second disparity map for the second image; and
merging the first and second disparity maps for the second image to generate the resultant disparity map for just the second image.

4. The method of claim 1, wherein the predicted occlusion information comprises likelihood of occlusion information.

5. The method of claim 4, wherein determining the second disparity map for the second image using the predicted occlusion information for the second image comprises applying a Markov Random Field algorithm to the likelihood of occlusion information.

6. The method of claim 1, wherein:
the first disparity map for the second image is determined directly from mapping the contents of the disparity map for the first image of the stereoscopic image to the second image; and
the second disparity map for the second image is determined by applying a Markov Random Field algorithm to the predicted occlusion information for the second image.

7. An apparatus to facilitate processing a stereoscopic image comprising a first and second image to facilitate computing a depth/disparity image, comprising:
a memory having stored therein the first image of the stereoscopic image and the second image;
a processor operably coupled to the memory and being configured and arranged for:
computing a disparity map for the first image of the stereoscopic image using predicted occlusion information for the first image of the stereoscopic image;
mapping contents of the disparity map for the first image of the stereoscopic image to the second image to determine predicted occlusion information for the second image and to determine a first disparity map for the second image;
determining a second disparity map for the second image using the predicted occlusion information for the second image;
merging the first and second disparity maps for the second image to generate a resultant disparity map for just the second image.

8. The apparatus of claim 7, wherein the processor is further configured and arranged for:
mapping contents of the second disparity map for the second image to the first image of the stereoscopic image to, thereby, determine subsequent predicted occlusion information for the first image of the stereoscopic image.

9. The apparatus of claim 7, wherein the processor is further configured and arranged for:
re-computing the disparity map for the first image of the stereoscopic image using the subsequent predicted occlusion information for the first image of the stereoscopic image; and
using the recomputed disparity map for the first image of the stereoscopic image, re-iterating the steps of:
mapping the contents of the disparity map for the first image of the stereoscopic image to the second image to determine the predicted occlusion information for the second image and to determine the first disparity map for the second image;
determining the second disparity map for the second image; and
merging the first and second disparity maps for the second image to generate the resultant disparity map for just the second image.

10. The apparatus of claim 7, wherein the predicted occlusion information comprises likelihood of occlusion information.

11. The apparatus of claim 10, wherein the processor is further configured and arranged for:
applying a Markov Random Field algorithm to the likelihood of occlusion information to determine the second disparity map for the second image using the predicted occlusion information for the second image.

12. The apparatus of claim 7, wherein the processor is further configured and arranged for:
determining the first disparity map for the second image directly from mapping the contents of the disparity map for the first image of the stereoscopic image to the second image; and
determining the second disparity map for the second image applying a Markov Random Field algorithm to the predicted occlusion information for the second image.

* * * * *